(12) United States Patent
Madsen et al.

(10) Patent No.: US 9,326,451 B1
(45) Date of Patent: May 3, 2016

(54) SEED PILLOW FOR OVERCOMING THE LIMITING FACTORS CONTROLLING RANGELAND RESEEDING SUCCESS

(71) Applicant: The United States of America, as represented by the Secretary of Agriculture, Washington, DC (US)

(72) Inventors: Matthew D Madsen, Hines, OR (US); Anthony J Svejcar, West Hines, OR (US)

(73) Assignee: The United States of America, as Represented by the Secretary of Agriculture, Washington, DC (US)

(*) Notice: Subject to any disclaimer, the term of this patent is extended or adjusted under 35 U.S.C. 154(b) by 120 days.

(21) Appl. No.: 14/039,873

(22) Filed: Sep. 27, 2013

Related U.S. Application Data

(60) Provisional application No. 61/707,853, filed on Sep. 28, 2012.

(51) Int. Cl.
*A01G 1/00* (2006.01)
(52) U.S. Cl.
CPC .......................... *A01G 1/00* (2013.01)
(58) Field of Classification Search
CPC .......... A01C 1/04; A01C 1/044; A01C 1/046; A01G 9/10; A01G 9/1013; A01G 9/102; A01G 9/1086; A01G 1/005
USPC .......... 47/65.7, 65.8, 73, 74, 77, 87, 48.5, 56, 47/1.01 F
IPC ...................... A01C 1/04; A01G 9/10
See application file for complete search history.

(56) References Cited

U.S. PATENT DOCUMENTS

| | | | | |
|---|---|---|---|---|
| 4,318,248 | A * | 3/1982 | Muldner | 47/56 |
| 5,235,781 | A * | 8/1993 | Holley | 47/56 |
| 6,735,902 | B1 * | 5/2004 | Ahm | 47/56 |
| 7,174,671 | B2 * | 2/2007 | Moore | 47/56 |
| 2005/0097816 | A1 * | 5/2005 | Elder et al. | 47/65.8 |
| 2007/0283621 | A1 * | 12/2007 | Holloway | 47/56 |
| 2011/0173879 | A1 * | 7/2011 | Bell | 47/48.5 |
| 2011/0225884 | A1 * | 9/2011 | Johnson | 47/59 S |

FOREIGN PATENT DOCUMENTS

GB 617040 * 1/1949

* cited by examiner

*Primary Examiner* — Lisa Tsang
(74) *Attorney, Agent, or Firm* — John D. Fado; G. Byron Stover

(57) ABSTRACT

The disclosure provides compositions and methods to improve seeding success. In an exemplary embodiment the compositions and methods disclosed herein are used to improve seeding success in rangeland areas. However, the compositions and methods are useful to improve seeding success in any environment where seeding is difficult. In an exemplary embodiment, the invention provides a "seed pillow", a multifunctional seed treatment that mitigates the limiting factors controlling seedling establishment. In one embodiment, the seed pillow comprises a pillow-shaped agglomeration of absorbent earth materials and other additives, with seeds attached within a concave well on the underneath side of the pillow. To increase the probability that the seeds will be covered by the pillow, soil and tackifier are placed with the seeds for increased weight on the seed side of the pillow, and to glue the pillow to the soil. The shape of the pillow is also designed to improve coverage by having a flat bottom and convex top. Upon wetting, the pillow material melts over the seeds, thus providing seed coverage and enhanced conditions for seed germination and growth.

17 Claims, 6 Drawing Sheets

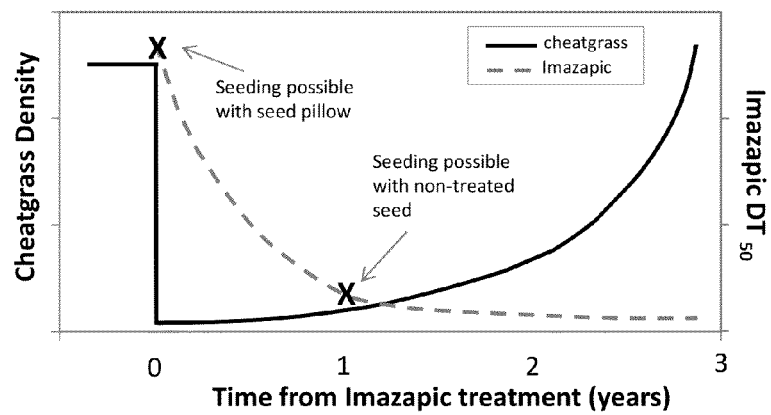
FIG. 4
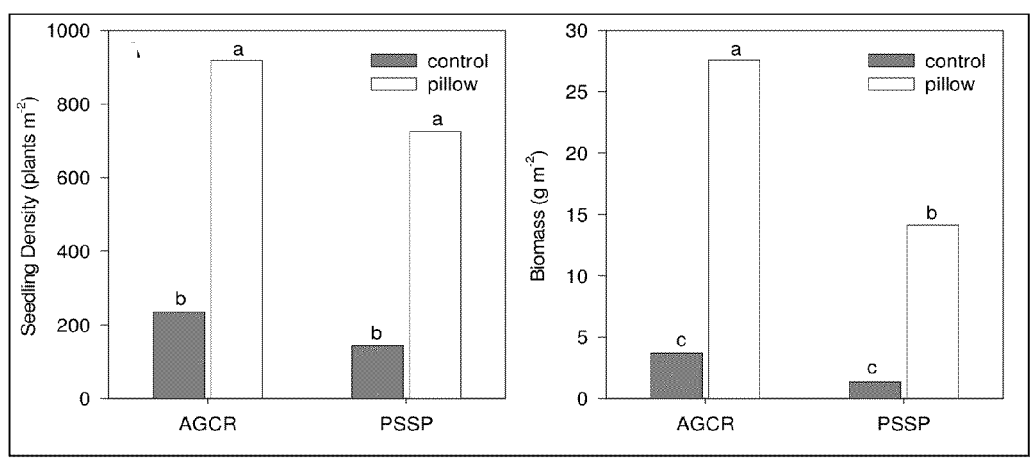
FIG. 5A
FIG. 5B

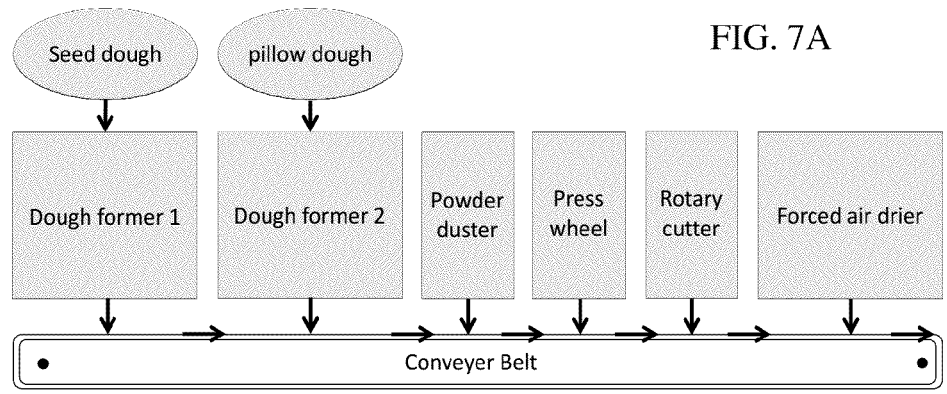
FIG. 7A
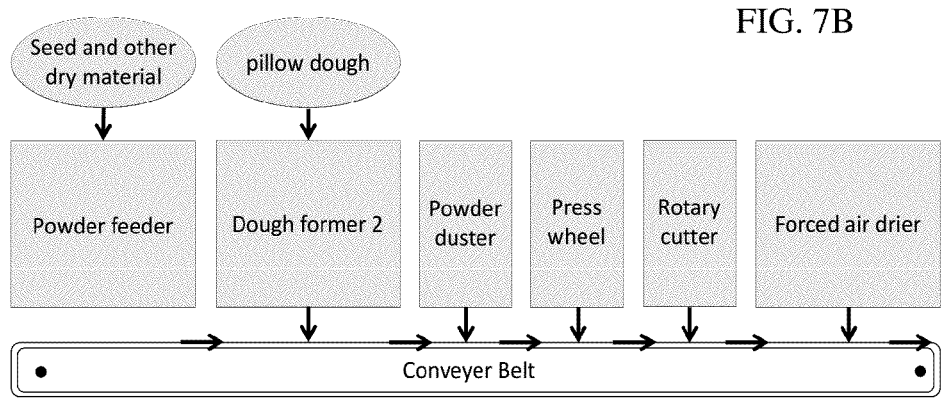
FIG. 7B
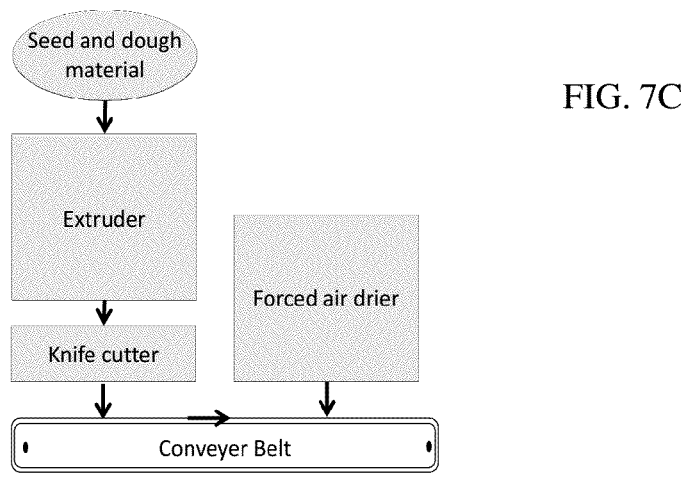
FIG. 7C
FIG. 7

SEED PILLOW FOR OVERCOMING THE LIMITING FACTORS CONTROLLING RANGELAND RESEEDING SUCCESS

REFERENCE TO RELATED APPLICATIONS

This application claims priority to U.S. Provisional Patent Application U.S. Ser. No. 61/707,853, filed Sep. 28, 2012, which is incorporated herein by reference in its entirety.

FIELD OF THE INVENTION

The invention relates to compositions and methods to improve seeding success. In an exemplary embodiment the compositions and methods disclosed herein are useful to improve seeding success in rangeland areas. However, the compositions and methods are useful to improve seeding success in any environment.

BACKGROUND OF THE INVENTION

The sage-steppe ecosystem of western North America is rapidly being converted to an exotic annual grassland (see e.g., Knapp 1996 Association of American Geographers 86:387-411; D'Antonio et al. 1992 Annual Review of Ecology and Sustainability 23: 63-87; Young 1992 Great Basin Naturalist 52:245-252; Chambers et al. 2007 Ecological Monographs: 77: 117-145). With this conversion, populations of hundreds of sagebrush obligate species are decreasing and at risk of extirpation (see e.g., Rowland et al. 2006 Biological Conservation 129: 323-335). Sage-grouse is an obligate species of particular concern that is currently a candidate species for listing under the Endangered Species Act. The listing of sage-grouse has the potential to dramatically limit land use activities in 11 western states, including the entire Great Basin. Annual grass invasion also directly impacts rangeland ecosystem goods and services by decreasing forage production and quality, reducing recreation opportunities, degrading water resources, and increasing fire frequency, which further promotes the dominance and spread of annual grasses (see e.g., D'Antonio et al. 1992 supra; Brooks et al. 2004 BioScience 54:677-688; Davies et al. 2011 Oecologia 167: 481-491; Brunson and Tanaka 2011 Rangeland Ecology and Management 64: 463-470).

Conversion to an exotic annual grassland typically occurs when severe disturbances degrade the system to a point where autogenic recovery is impaired. Large-scale, high intensity wildfires, drought, and over-grazing are common disturbances that can leave sagebrush systems incapable of self-repair (see e.g., Bestelmeyer et al. 2009 Rangeland Ecology and Management 62: 1-15). The resource vacuum that typically occurs following high severity disturbance events increases the susceptibility of the site to weed invasion (see e.g., Miller and Tausch 2001 The role of fire in pinyon and juniper woodlands: a descriptive analysis. Pages 15-30 in K. E. M. Galley and T. P. Wilson (eds.). Proceedings of the Invasive Species Workshop: the Role of Fire in the Control and Spread of Invasive Species. Fire Conference 2000: the First National Congress on Fire Ecology, Prevention, and Management. Miscellaneous Publication No. 11, Tall Timbers Research Station, Tallahassee, Fla.; Bestelmeyer et al. 2009 supra). Land managers can halt the shift to an introduced annual community by successfully reestablishing native or desired non-native species following disturbance (see e.g., Goodrich and Rooks 1999 Control of weeds at a pinyon-juniper site by seeding grasses. In: S. B. Monsen and R. Stevens [EDS.]. Proceedings: ecology and management of pinyon-juniper communities within the interior West. Ogden, Utah, USA: US Department of Agriculture, Forest Service, RMRS-P-9. p. 403-407; Ott et al. 2001 Journal of Range Management 56: 81-91). Unfortunately, the success rate of post-disturbance revegetation efforts is notoriously low (see e.g., Lysne and Pellant 2004 Establishment of aerially seeded big sagebrush following southern Idaho wildfires. Tech. Bull. 2004-01. Boise, Id.: U.S. Department of the Interior, Bureau of Land Management, Idaho State Office. p. 14; Epanchin-Neil et al. 2009 Journal of Environmental Management 91: 370-379; James et al. 2011 Journal of Applied Ecology 48:961-969). Failure rates may approach 90% in many cases, but the true rate of failure is poorly understood, due to the underreporting of negative results in the literature (see e.g., Hardegree et al. 2011 Assessment of range planting as a conservation practice [chapter 4]. In Briske, D. D., ed. Conservation benefits of rangeland practices: assessment, recommendations, and knowledge gaps. US Department of Agriculture, Natural Resources Conservation Service. p. 171-212). Once the site transitions to an annual-dominated system, restoration costs increase dramatically, while the probability of restoring perennial plants back to the system is reduced even further (see e.g., Rafferty and Young 2002 Journal of Range Management 55:70-72; Eiswerth et al. 2009 Journal of Environmental Management 90:1320-1325).

The inability of current restoration technologies to consistently establish native plants from seed indicates that the technologies being used do not address the primary sources of mortality in the progression from seed to established plant (James et al. 2011 supra). This is because much of the effort to restore rangelands with desired perennial species has been based on the scaling-up of decades-old row crop agriculture technology (e.g. re-seeding with seed drills) without taking the time to define specific ecological barriers to restoration success or practices to overcome such barriers. It is now clear that traditional interdictory-based approaches to solving the annual grass problem have not been sufficient to offset losses, despite large monetary investments (see e.g., Kay et al. 1981 Fremontia 9:11-15). Thus, to sustain the ecological integrity and productivity of western US rangelands there is a substantial need to develop methodologies and technologies that result in the establishment of functional plant communities following a catastrophic disturbances.

Fortunately, as will be clear from the following disclosure the present invention provides for these and other needs.

SUMMARY OF THE INVENTION

In one aspect, the present disclosure provides a pillow-shaped multifunctional seed treatment that facilitates seedling establishment, the pillow-shaped multifunctional seed treatment comprising: (i) absorbent filler materials; (ii) a binder solution; (iii) soil, sand or a combination thereof, and (iv) seeds, wherein, the pillow shaped multifunctional seed treatment has a top cover layer and a bottom core layer, the bottom core layer having a bottom surface that does not contact the top cover layer, and wherein at least the seeds and soil are located in the bottom core layer of the pillow-shaped multifunctional seed treatment, thereby increasing the weight in the bottom core layer of the pillow-shaped multifunctional seed treatment, wherein locating the seed and soil, sand or combination thereof in the bottom core layer of the pillow-shaped multifunctional seed treatment facilitates placement of the seeds and soil, sand or combination thereof, closest to the ground, and wherein the top cover layer is comprised primarily of absorbent filler materials. In one exemplary embodiment, the pillow-shaped multifunctional seed treatment further comprises a tackifier on the bottom surface of the bottom core layer. In one exemplary embodiment, the seeds are members selected from the group consisting of seeds of the same species and seeds of different species. In another exemplary embodiment, the seeds of different species comprise seeds from at least one nurse-plant. In another exemplary embodiment, the absorbent filler materials are members selected from the group consisting of diatomaceous earth, beat pulp, peat moss, coir fiber, wood fiber, rockwool, activated charcoal and superabsorbent polymers or a combination of said members. In another exemplary embodiment, the binder solution is a member selected from the group consisting of STARCH 1500® and SELVOL-205 or a combination of said members. In another exemplary embodiment, the binder solution comprises a plant growth regulator. In another exemplary embodiment, the pillow shaped multifunctional seed treatment further comprises at least one member of the group consisting of biostimulants, and plant protectants or a combination thereof. In one exemplary embodiment, the biostimulates are members of the group consisting of manure, fertilizers, inoculates, wetting agents/soil surfactants, and growth regulators or a combination thereof; and the plant protectants are members of the group consisting of fungicides, insecticides and deterrents or a combination thereof. In another exemplary embodiment, the fertilizers are located primarily in the top cover layer. In another exemplary embodiment, the bottom core layer of the multifunctional seed treatment further comprises at least one absorbent filler material. In another exemplary embodiment, the at least one absorbent filler material is a member selected from the group consisting of activated charcoal and biochar or a combination thereof. In another exemplary embodiment, the multifunctional seed treatment is applied to ground soil at the same time herbicide is applied. In another exemplary embodiment, the pillow shaped multifunctional seed treatment is applied to ground soil by broadcast seeding. In another exemplary embodiment, the multifunctional seed treatment is applied to ground soil having a surface and a substrate by drill seeding, wherein the multifunctional seed treatment is applied to the ground soil, so that the top over layer is near the surface and the bottom core layer is within the substrate. In another exemplary embodiment, the bottom core layer does not contain binder solution.

In another aspect, the present disclosure provides a pillow-shaped multifunctional seed treatment that facilitates seedling establishment, the multifunctional seed comprising: (i) absorbent filler materials; (ii) a binder solution; and (iii) seeds. In one exemplary embodiment, the multifunctional seed treatment further comprises soil, sand or a combination thereof. In another exemplary embodiment, the seeds are members selected from the group consisting of seeds of the same species and seeds of different species. In another exemplary embodiment, the seeds of different species comprise seeds from at last one nurse-plant. In another exemplary embodiment, the absorbent filler materials are members selected from the group consisting of diatomaceous earth, beat pulp, peat moss, coir fiber, wood fiber, rockwool, activated charcoal and superabsorbent polymers or a combination of said members. In another exemplary embodiment, the binder solution is a member selected from the group consisting of STARCH 1500® and SELVOL-205 or a combination of said members. In another exemplary embodiment, the multifunctional seed treatment further comprises at least one member of the group consisting of biostimulants, and plant protectants or a combination thereof. In another exemplary embodiment, the biostimulants are members of the group consisting of manure, fertilizers, inoculates, wetting agents/soil surfactants, and growth regulators or a combination thereof; and the plant protectants are members of the group consisting of fungicides, insecticides and deterrents or a combination thereof. In another exemplary embodiment, the at least one absorbent filler material is a member selected from the group consisting of activated charcoal and biochar or a combination thereof. In another exemplary embodiment, the multifunctional seed treatment is applied to ground soil at the same time herbicide is applied. In another exemplary embodiment, the pillow shaped multifunctional seed treatment is applied to ground soil by broadcast seeding. In another exemplary embodiment, the multifunctional seed treatment is in the form of a cylindrical pellet, and wherein the multifunctional seed treatment is applied to ground soil by drill seeding.

Other features, objects and advantages of the invention will be apparent from the detailed description which follows.

BRIEF DESCRIPTION OF THE DRAWINGS

FIG. 1B. Precipitation melts the pillow material over the seeds and enhances seed soil contact. FIG. 1C. Photo showing a single seedling grown from non-treated seed. FIG. 1D. seedlings growing from a seed pillow.

FIG. 3A. No treatment was applied and cheatgrass dominated the growing space. FIG. 3B Soil was treated at 10 oz/acre with the pre-emergent herbicide imazapic, both cheatgrass and bluebunch wheatgrass growth was arrested. FIG. 3C. Bluebunch wheatgrass seed was incorporated into seed pillow of activated carbon prior to applying imazapic at 8 oz/acre; bluebunch wheatgrass grew, while cheatgrass was suppressed.

FIG. 4. Theoretical model of cheatgrass (*Bromus tectorum* L.) density overtime after treatment with the soil active herbicide imazapic, and dissipation rate (half-life) of imazapic (DT50) after application. Traditional seeding approaches with non-treated seed require that seeding efforts be postponed for one year after imazapic application to allow concentrations of the product to dissipate to levels that are not toxic to seed and seedlings. Our newly developed seed pillows with activated carbon may allow seeding to occur at the same time cheatgrass or other exotic annual grasses are being controlled by imazapic or other soil active herbicide. Earlier seeding allows plants to grow with less competition from the weed that is being controlled FIG. 5A. Average plant density and FIG. 5B. biomass production from non-treated seeds (control) and seeds attached to a pillow for crested wheatgrass (AGCR) and bluebunch wheatgrass (PSSP). Unique letters indicate significance using the Tukey-Kramer honestly significant difference test ($P<0.05$).

FIG. 7A. Diagram of process for producing seed pillows that have two extruded layers (seed-core and cover layer). FIG. 7B. Diagram of process for producing seed pillows that have two extruded layer with seed-core delivered as dry material and top-layer extruded. FIG. 7C. Diagram of process for producing seed pillows that have single layer seed pillow formed for either broadcast seeding (pillow shaped) or cylindrical for drill seeding.

DETAILED DESCRIPTION OF THE INVENTION

Definitions

Figure 1:
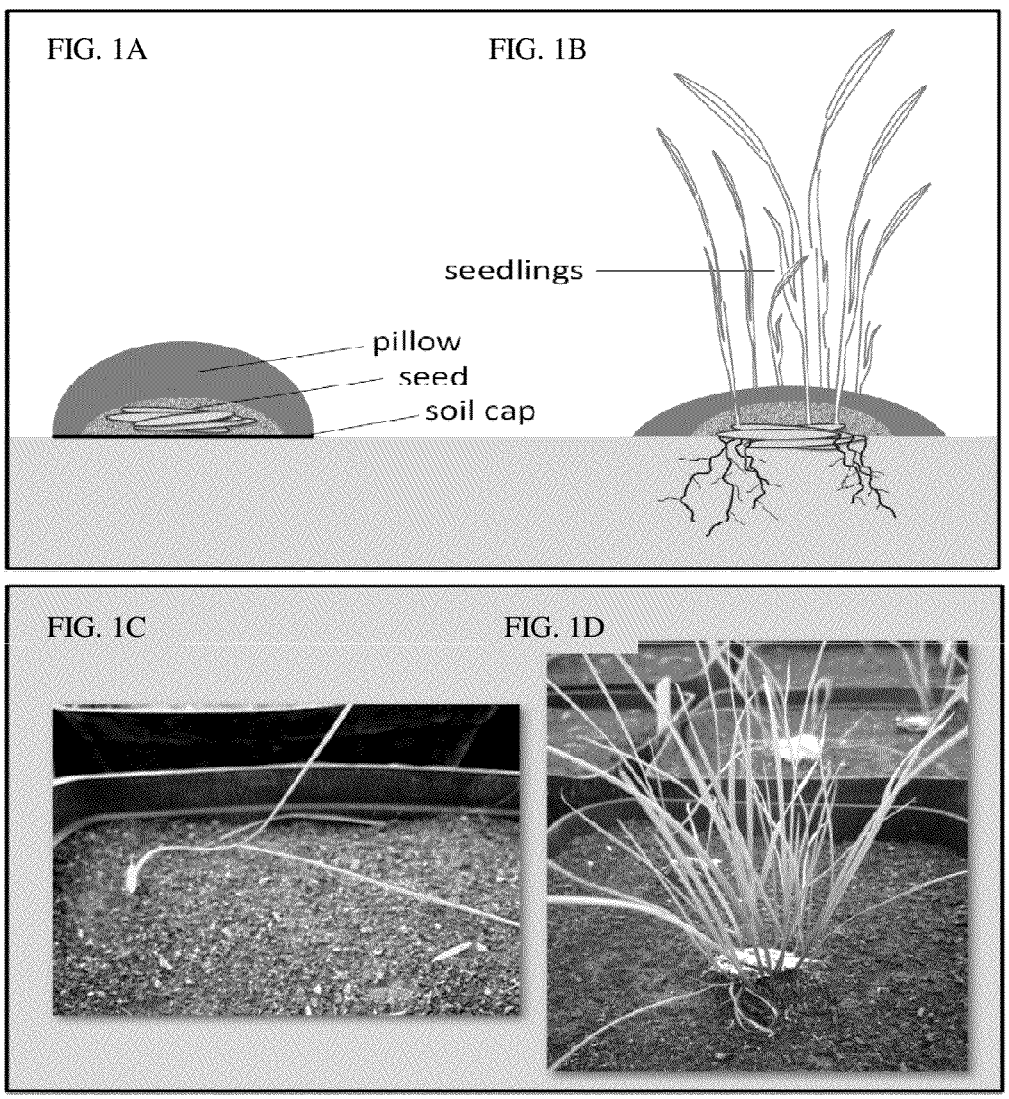
FIG. 1 A. Schematic diagram of seeds attached to a seed pillow.

As used herein, the term "seed pillow" refers to a pillow shaped multifunctional seed treatment as disclosed herein.

The expression "pillow-shaped" as used herein refers to an object shape that resembles that of a pillow. Since pillows can come in many shapes, a "pillow shaped" object such as e.g., a "seed pillow" may also come in many shapes. For example, a pillow shape can be square, rectangular, round, circular, hexagonal or cylindrical. Furthermore, a pillow may be shaped either the same or differently on the top side and the bottom side. Thus in an exemplary embodiment, a "pillow shaped" object is flat on the bottom and rounded on the top. Thus, "a pillow-shaped multifunctional seed treatment" is a composition having a pillow shape.

As used herein, the term "absorbent filler materials" or "absorbent earth materials" refers to materials that absorb water and thereby draw water into a seed pillow. Exemplary "absorbent filler materials" include but are not limited to diatomaceous earth, beat pulp, peat moss, coir fiber, wood fiber, rockwool, activated charcoal and superabsorbent polymers.

As used herein, the term "binder solution" refers to a solution comprising a substance that facilitates the creates uniform consistency, solidification, or cohesion. In general a binder component is composed of an adhesive polymer that may be natural or synthetic and is without phytotoxic effect. Exemplary binder solutions include but are not limited to STARCH 1500® and SELVOL-205®, polyvinyl acetates, polyvinyl acetate copolymers (-ethylene), polyvinyl alcohols, polyvinyl alcohol copolymers, celluloses, including ethylcelluloses and methylcelluloses, hydroxymethylcelluloses, hydroxypropylcellulose, hydroxymethylpropylcelluloses, polyvinylpyrolidones, dextrins, maltodextrins, polysaccharides, fats, oils, proteins, gum arabics, shellacs, vinylidene chloride, vinylidene chloride copolymers, calcium lignosulfonates, acrylic copolymers, starches, polyvinylacrylates, zeins, gelatin, carboxymethylcellulose, chitosan, polyethylene oxide, acrylimide polymers and copolymers, polyhydroxyethyl acrylate, methylacrylimide monomers, alginate, ethylcellulose, polychloroprene and syrups or mixtures thereof. Preferred binders include polymers and copolymers of vinyl acetate, methyl cellulose, polyvinyl alcohol, vinylidene chloride, acrylic, cellulose, polyvinylpyrrolidone and polysaccharide. The above-identified polymers include those known in the art and for example some are identified as RHOPLEX™ B-60A, METHOCEL™ A 15LV, METHOCEL™ E15LV, CELLOSIZE™ QP, AIRFLEX™ 500, DARATAK™ SP 1090, ELVANOL™ 85-30, RHOPLEX™ AC-33-NP, RHOPLEX™ B-85 and VINAMUL™ 18132. Particularly preferred classes of polymers include polymers and copolymers of vinylidene chloride and vinyl acetate-ethylene copolymers.

As used herein, the term "tackifier" refers to substances used improve the stickiness or "tack" of a surface. Exemplary tackifiers suitable for used in the compositions and method disclosed herein include, but are not limited to psyllium husk, guar, corn starch, etc.

As used herein, the term "nurse-plant" to a "helper" plant which function to improve growing conditions for a desired or target plant species. Typically "nurse plants" improve site conditions by e.g., trapping precipitation (such as windblown snow), scavenging for soil nutrients, increasing organic matter, suppressing weeds, and/or stimulating microbial activity in the ground soil. Exemplary "nurse plant" species include, but are not limited to cover-crop species (such as e.g., alfalfa, oilseed radish, winter pea, pacific gold mustard, oats, and cereal rye).

As used herein, the term "biostimulants", "bio-stimulates" or "biostimulates" refers to a diverse formulation of compounds, substances and other products that are applied to plants or soils to regulate and enhance a plant's physiological processes, thus making them more productive and/or vigorous. Biostimulants act on the plant through different pathways to improve crop vigor, yields, and/or quality. Exemplary "biostimulants" include but are not limited to manure, fertilizers, inoculates, wetting agents/soil surfactants, vitamins, humic and fulvic acids, surfactants and plant growth regulators.

As used herein, the term "plant growth regulator" or "growth regulator" refers to signal molecules which regulate cellular processes of the plant. Typically, "plant growth regulators" in small amounts promote and influence the growth, development, and differentiation of plant cells and tissues. Exemplary a plant growth regulators include, but are not limited to hormones such as e.g. auxins, gibberellic acid, and cytokinins.

As used herein, the term "inoculants" or "inoculates" refers to inoculation with spores of beneficial microorganisms.

As used herein, the term "plant protectant" refers to substances or structures that protect plants especially seedlings from damage or destruction predation by e.g., fungi, insects, nematodes, mammals, etc. Exemplary "plant protectants" include, but are not limited to fungicides, insecticides and deterrents such as e.g., rodent deterrents e.g., capsacin.

As used herein, the term "ground soil" refers to soil onto or into which seed is to be sown. This is distinguished from "soil" as in "soil, sand or a combination thereof" which in some exemplary embodiments is an ingredient of a "seed pillow".

I. INTRODUCTION

A. Restoring and Reseeding Rangelands

Rangelands occupy over a third of global land area, and in many cases are in less than optimum condition as a result of past land use, catastrophic wildfire and other disturbance, invasive species, or climate change. Often the only means of restoring these lands involves seeding desirable species, yet, until the instant disclosure, there were few effective seeding technologies, especially for the more arid rangeland types. The inability to consistently establish desired plants from seed indicates that the seeding technologies being used are not successful in addressing the primary sources of mortality in the progression from seed to established plant. Fortunately, "seed pillow" technology disclosed herein allows for the physical manipulation and application of materials to the seed that enhance germination, emergence, and/or early seedling growth and establishment.

B. Major Limitations to Rangeland Seeding

1. Premature Germination

In the cold desert regions of North America, seeds are typically planted in late fall, which allows seed dormancy to be released and insures that seeds are in place in the spring when soil temperature and moisture are more favorable for seed germination and plant establishment (see e.g., Monson et al., 2004 Restoring western ranges and wildlands. Volume 3. Fort Collins, Colo.: U.S. Department of Agriculture, Forest Service, Rocky Mountain Research Station Gen. Tech. Rep. RMRS-GTR-136-Vol-3. Pp. 699-866). However, the majority of the seeds planted are typically cool season bunchgrass species, which exhibit minimal to no dormancy at the time of seeding, e.g. bluebunch wheatgrass (*Pseudoroegneria spicata* (Pursh) A. Löve), bottlebrush squirreltail (*Elymus elymoides* (Raf.) Swezey), and Idaho fescue (*Festuca idahoensis* Elmer)). Recent research (James and Svejcar 2010 Rangeland Ecology and Management 63: 491-495; James et al. 2011 supra; Boyd and James 2012 Rangeland Ecology and Management) indicates that when seeds are planted during the fall period, germination is rapid and may reach 70% prior to the onset of winter, but emergence of germinated seeds does not occur prior until the spring. The survival of these germinated but non-emergent seedlings can be greatly decreased by the harsh overwinter soil environment (see e.g., Stevens and Monsen, 2004 Guidelines for restoration and rehabilitation of principal plant communities. In: S. B. Monsen, R. Stevens, N. L. Shaw, comps. Restoring western ranges and wildlands, vol. 1. Gen. Tech. Rep. RMRS-GTR-136-vol-1. Fort Collins, Colo.: U.S. Department of Agriculture, Forest Service, Rocky Mountain Research Station. p. 199-294). Laboratory results by Boyd et al. (In Preparation supra) have shown that freeze-thaw events may be a significant mechanism responsible for mortality of germinated but non-emergent seedlings. Seeds planted in the fall may also experience high mortality from pathogens. Fungal disease organisms can cause seed and seedling mortality through seed rot, damping-off, seedling blights, and root rot. These diseases are most severe where cool, moist conditions occur (see e.g., Harper et al. 1995 New Phytologist, 54, 119-131; Kirkpatrick and Bazzaz 1979 Journal of Applied Ecology, 16, 515-527; Neher et al. 1987 Oecologia 74: 419-424). After planting, rangeland seedlings are incubated under these types of conditions for several months prior to emergence, which can result in significant losses to seeds and seedlings from pathogens (see e.g., Aanderud et al. 2012 Snowfall influences potential fungal seed pathogens and the seedling recruitment of invasive and native grasses. Abstracts of the 65th Annual Meeting of the Society for Range Management, Spokane, Wash.).

2. Soil Crusting

Demography research on rangeland seedings in the Great Basin region of the western United States has shown that seedling emergence represents a major developmental bottleneck in the progression from seed to an established plant (see e.g., James and Svejcar 2010 supra; James et al. 2011 supra). One factor that can act as a significant barrier to seedling emergence is the presence of non-biotic soil-surface crusts (see e.g., Unger 1984; Awadhwal and Thierstein 1985 Soil and Tillage Research, 5, 289-302; Belnap 2003 Comparative structure of physical and biological soil crusts. Biological Soil Crusts: Structure, Function and Management (eds J. Belnap & O. L. Lange), pp. 177-192. Springer-Verlag, Berlin; Madsen et al. 2012 Influence of soil water repellency on seedling emergence and plant survival in a burned semi-arid woodland. In Press Arid Land Research and Management In Press). Soil physical crust is characterized by a dense, relatively impermeable soil surface feature, which impedes seedling emergence while decreasing water infiltration and gas exchange (see e.g., Belnap 2003 supra).

3. Improper Planting Depth or Technique

In arid systems, seed soil coverage at an appropriate depth is assumed to be one of the most critical factors for successful seedling establishment (see e.g., Nelson et al. 1970 Journal of Range Management. 23: 163-170; Stevens and Van Epps 1984 Seeding techniques to improve establishment of forage kochia (*Kochia prostrata* [L.] Schrad.) and fourwing saltbush (*Atriplex canescens* [Pursh.] Nutt.). In: A. R. Tiedemann, E. D. McArthur, H. C. Stutz, R. Stevens, and K. L. Johnson, comps. Proceedings—symposium on the biology of *Atriplex* and related chenopods; 1983 May 2-6; Provo, Utah. Gen. Tech. Rep. INT-172. Ogden, Utah: U. S. Department of Agriculture, Forest Service, Intermountain Forest and Range Experiment Station: 269-272; Ott et al. 2003 supra; Monson et al. 2004 supra; James and Svejcar 2010 supra). Where economic and site conditions allow, a seed drill can be used to position and cover seeds in the soil. However, seeders used in rangelands often either plant seeds too deep or too shallow, which can curtail seed germination and seedling emergence (see e.g., James and Svejcar 2010 supra; Thompson et al. 2006). As an example, James and Svejcar (2010) found that seedling density was more than seven-fold higher when hand placed at the proper depth, in comparison to seeding with a rangeland drill. Even when seeds are planted properly, erosion and depositional events after seeding can alter seed placement.

In many situations, it is not possible to use equipment to cover the seed due to a host of logistical constraints, such as the site being too steep and/or rocky, high densities of tree skeletons, lack of resources, and cultural constraints such as archaeological sites or wilderness areas (see e.g., Vallentine 1989 Range development and improvements, 3rd ed. San Diego, Calif. Academic Press. 524 p; Bryan et al. 2011 Rangeland Ecology and Management 64: 171-177). Under these conditions, land managers are constrained to use broadcast seeding techniques (i.e. spreading seed by hand or mechanically over the soil surface) (see e.g., Vallentine 1989 supra; Whisenant 1999 Repairing damaged wildlands: a process-oriented, landscape-scale approach. Cambridge, UK: Cambridge University Press. 312 p). Under this scenario, successful germination and establishment is highly dependent on the probability of the seed falling within a safe site that contains adequate nutrients and moisture and is protected from predation (see e.g., Harper et al., 1965; Fowler 1986 American Midland Naturalist 115:131-145; Chambers, 2000 Ecological Applications. 10:1400-1413). Particularly within arid low elevations sites, where the ground has not been prepared, studies have shown that aerial seeding alone is not a reliable restoration approach (see e.g., Hull 1959 Journal of Range Management 12:155-163; Nelson et al. 1970 supra; Allen 1995 Restoration ecology: limits and possibilities in arid and semiarid lands. In: B. A. Roundy, E. D. McArthur, J. S. Haley, and D. K. Mann [COMPS.]. Proceeding: wildland shrub and arid land restoration symposium. Ogden, Utah, USA: US Department of Agriculture, Forest Service, INT-GTR-315. p. 7-15; Tausch et al. 1995; Ott et al. 2003 supra; Lysne and Pellant 2004 supra). For example, Lysne and Pellant (2004) found that aerially seeded big sagebrush failed to establish on 23 of 35 fire rehabilitation projects examined.

4. Drought

Inadequate water availability is commonly cited as a key factor limiting seedling establishment (see e.g., Fowler, 1986 supra; Abbott and Roundy, 2003; Jessop and Anderson, 2007 Rangeland Ecology and Management 60:235-243; Hulet et al., 2010 Rangeland Ecology and Management 63: 450-460). For instance, within semiarid hot deserts of North America, yearly precipitation is highly variable; subsequently, plant establishment is perceived to be most successful on a wet year, or during a series of wet years (see e.g., Jordan and Nobel, 1981 Ecology. 62: 901-906; Romney et al., 1987 Pulse establishment of woody shrubs on denuded Mojave desert land. In: E. D. McArthur, A. Wallace, M. R. Haferkamp, eds. Proceedings—symposium on shrub ecophysiology and biotechnology. General Technical Report INT-256. Ogden, Utah: USDA Forest Service: 54-57; Hardegree et al. 2011 supra). Timing and amount of precipitation during the year are also episodic and believed to exert a strong control on native plant establishment. For example, Abbott and Roundy (2003) demonstrated that native grass seedling survival is dependent on the pattern of soil moisture availability, with high seedling mortality following dry periods between storms.

5. Water Repellency

Following a fire, a wettable surface layer is commonly found overlying a water repellent layer (see e.g., DeBano et al., 1976 Pulse establishment of woody shrubs on denuded Mojave desert land. In: E. D. McArthur, A. Wallace, M. R. Haferkamp, eds. Proceedings—symposium on shrub ecophysiology and biotechnology. General Technical Report INT-256. Ogden, Utah: USDA Forest Service: 54-57; DeBano et al., 1970 Soil Science Society of America Proceedings 34: 130-133; Savage, 1974 Soil Science Society of America Proceedings, 38, 652-657; Letey, 2001 Hydrological Process 15:2867-2875). Research by Madsen et al. (2012b, supra) demonstrated that seeds which germinate within this upper wettable layer are subject to desiccation. This is due to a decrease in infiltration and retention of water in soil with water repellency, and from the hydrophobic layer disconnecting the seedlings from the underlying soil moisture reserves (see e.g., Adams et al., 1970 Ecology 51:696-700; Madsen et al., 2012 supra). Lack of seedling establishment directly after a fire provides an opportunity for invasion of annual weeds in subsequent years, after soil water repellency has dissipated. The resultant soil composition also promotes site instability when the wettable surface layer becomes saturated. This saturation causes water, soil, and debris to quickly flow down slope, resulting in site degradation, pollution of streams and lakes, and potential property damage (see e.g., Doerr et al., 2009 Soil water repellency: A key factor in post-fire erosion. In: Cerda, A. and P. Robichaud. (Eds) Fire effects on soils and restoration strategies. Enfield, N.H., USA: Science Publishers, Inc., p. 197-224).

6. Competition

At the seedling stage, perennial sagebrush steppe species cannot effectively compete in an exotic annual dominated system, such as those occupied by cheatgrass (*Bromus tectorum* L.) or medusahead (*Taeniatherum caput-medusae* [L.] Nevski subsp. *asperum* [Simonk] Melderis). The ability of these annual weeds to outcompete perennial species is generally associated with annuals having faster germination velocity, greater germination potential (see e.g., Young et al. 1998 Weed Technology 12:402-405; Clausnitzer et al. 1999 Weed Science 47: 720-728), and higher growth rate levels (see e.g., Arredondo et al. 1998 Journal of Range Management 51:584-589; Monaco et al. 2003 J. Range Manage. 56: 282-290; Chambers et al., 2007 supra). In addition to greater competition at the individual plant level, annuals typically grow in high plant densities, upwards of 1000 plants m-2 which preempts available resources for native plant establishment (see e.g., Young 1992 supra).

II. SEED PILLOW TECHNOLOGY

One exemplary embodiment the disclosure provides a "seed pillow" that in an exemplary embodiment, is useful in methods for improving rangeland-seeding success. The "seed pillow", is a multifunctional seed treatment engineered to mitigate the limiting factors controlling seedling establishment. Because factors limiting seedling success vary spatially and temporally across the landscape, by species, the structural design and composition of the seed pillow is engineered to address specific restoration challenges.

In an exemplary embodiment, a seed pillow comprises a pillow-shaped agglomeration of absorbent earth materials and other additives, with seeds attached within a concave side or pressed into the underneath side of the pillow (see e.g., FIG. 1). With this shape, a broadcasted seed pillow tumbling along the soil surface is more likely to come to rest with the bottom of the pillow towards the ground. During a precipitation event, the pillow material melts over the seeds, thus providing seed coverage and enhanced conditions for seed germination and growth.

A. Methods for Applying Seed Pillows to Ground Soil

1. Broadcast Seeding

Unlike drill seeding methods that are typically constrained to fall plantings when the soil is dry, seed pillow technology allows land managers to plant under a variety of soil conditions, including soils that are wet or frozen, which are typical of early spring conditions. By planting in the spring, land managers can circumvent the harsh environmental extremes associated with fall plantings such as winter drought, predation, freezing temperatures, and pathogen attack.

In some exemplary embodiments, seeds planted in the spring with seed pillows are treated through priming and/or bio-stimulates to respond similar to an exotic annual grass by promoting rapid germination velocity and root growth. Such an approach helps ensure that a high density of plants will establish on the site and survive by having a root growth rate that is capable of keeping up with a receding wetting front. Rapid germination in seeds planted in a pillow is achieved by incorporating absorbent powder material (e.g. diatomaceous earth, beat pulp, activated charcoal, super absorbent polymers), biostimulates (e.g. fertilizers, inoculates, wetting agents/soil surfactants, growth regulators), and plant protectants (e.g. fungicides, insecticides). For more rapid germination seeds can be primed prior to incorporating into the pillow (see e.g., Hardegree 1994 Agronomy Journal 86: 289-293) or treated to break seed dormancy (e.g. chemical and mechanical scarification, stratification, hormonal treatments).

Limitations associated with seeds being buried too deep or impaired by soil crusting are diminished as the seedlings are able to grow within an environment that is engineered for enhanced seed germination and emergence. The pillow mass also offers stability to the seed and growing seedling, which minimizes seed loss from erosional forces and provides seedlings with the necessary leverage required for root penetration of the soil and site stability.

This technology can be applied to a variety of seed sizes and types, which allows for the seeding of a diversity of native plant species. Because seeding with seed pillows does not require the use of disks or other mechanical equipment to plant the seed, the technology can be used to increase abundance of limiting species without disturbing native species that are already present on the site.

Pillows allow the delivery of seed amendments at rates that are several hundred percent higher than can be delivered through standard seed coating technology. In drought-prone environments, this technology may have substantial benefits for increasing water availability to the seedling by incorporating absorbent earth materials and super-absorbent polymers capable of retaining up to 400 times their weight in water. In cases where water repellency or low moisture availability is limiting seedling survival, soil surfactants can also be incorporated into the pillow. Precipitation leaches the soil surfactant from the pillow into the soil, where it preferentially increases soil water content and the duration of soil water availability for seeds and seedlings.

Pillows can also be used as a carrier for various amendments designed for increasing plant nutrient availability, such as inoculation with spores of beneficial microorganisms, and fertilizers. In degraded rangeland systems where plant nutrients are limiting, increasing nutrient availability improves plant fitness, which increases the probability of plant establishment (see e.g., Madsen and Svejcar 2011 Development and Application of "Seed Pillow" Technology for Overcoming the Limiting Factors Controlling Rangeland Reseeding Success" Ser. No. 13/478,250). For example, newly emerged seedlings with vigorous root growth are less likely desiccate because their roots are better able to keep up with a receding wetting front. Where weeds are present, this technology gives seeded species an advantage because nutrient availability is only increased within the micro-site surrounding the planted seeds.

2. Drill Seeding

In some instances drill-seeding is the desired method for planting. Drill seeded pillows are formed by first making a dough mixture containing seed, water sensitive binders, hydrophilic filler materials and other additives deemed appropriate for the seed and locations being planted (e.g., fungicide, various bio-stimulates such as growth regulators, fertilizers, inoculates). The material is then run through an extruder that forms and chops the dough into cylindrical pellets. Thus, in an exemplary embodiment, a seed pillow is a seed pellet.

Figure 2:
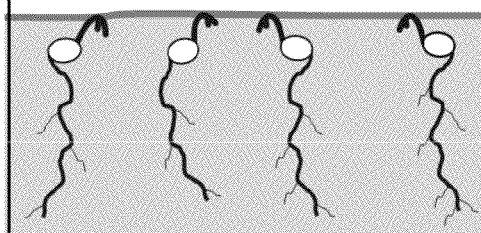
FIG. 2 A. Illustration of seedling emergence being impeded by a physical soil crust layer, FIG. 2B. seeds in an extruded seed pellet that are able to bypass the soil crust layer and emerge from the soil.
Figure 2:
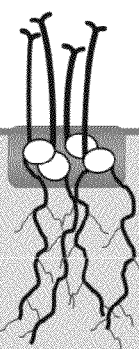

In exemplary embodiments, the seed pellet creates an environment that enhances seedling emergence from the pellet. Thus, in an exemplary embodiment, when the pellets are drill seeded with the top of the pellet near the soil surface, the emerging seedlings are able to by-pass restrictive near surface soil layers (such as soil physical crust, see e.g., FIG. 2). Particularly for small seeded species, enhanced emergence potential further helps improve seeding success by allowing seeds to be planted at deeper soil depths where soil water potential levels are more conducive for seed germination and seedling survival.

In general, the type of materials used in constructing the seed pellet facilitate the ability of the seed pellet, to remain rigid enough to keep from crumbling during shipping and planting; conversely, after planting it is required that the pellet rapidly dissolve so emerging seedlings are not constrained within the pellet. In an exemplary embodiment, it has now been discovered that a partially pregelatinized maize starch, trade name STARCH 1500 ® (Colorcon, West Point, Pa.) provides both rigidity for planting and rapid breakdown after planting. However, any suitable binders or adhesive that could fulfill the above disclosed properties of the seed pellet are suitable for use for use in the methods and compositions disclosed herein.

In some exemplary embodiments, various filler materials are be used as a base material that is mixed with a binder to form dough that can be run through an extruder to produce seed pellets. In an exemplary embodiment, the filler is diatomaceous earth. Indeed, diatomaceous earth has high water absorption capacity, neutral pH, and is source of silicon, and thus facilitates drought resistance. As with seed pillows, the utility of the pellet can be further improved by adding other absorbent materials that have the capacity to swell within the pellet and create voids for oxygen exchange and pathways for emerging seedlings. Exemplary absorbent materials include, but are not limited to beat pulp, super absorbent polymers, peat moss, coir fiber, wood fiber, and rockwool. Additionally, seedling emergence is enhanced by increasing plant vigor through adding bio-stimulants (e.g. fertilizers, inoculates, wetting agents/soil surfactants, growth regulators), and plant protectants (e.g. fungicides, insecticides).

Plantability of seed that is associated with a high percentage of other plant parts that impede the flow of seed in standard seed drills can be increased by incorporating seed materials into an extruded pellet. For example, commercial sagebrush (*Artemisia tridentata* Nutt. ssp.) seed is associated with a large percentage (>80%) of non-seed parts (e.g., achenes, seed bracts, leaves, and fine stems). This material causes bridging within the seed box, and subsequently can only be sown using specialized planters. By incorporating sagebrush seed and associated non-plant parts into the pellet, the material is able to better flow through the drill. Furthermore, carriers such as rice hulls do not need to be incorporated when small seeds are incorporated in the seed mix because seeds are attached to a larger unit, which keeps the seeds from settling in the drill box.

The seed pillow disclosed herein, provides collective grouping of seeds within the same microsite during planting. Accordingly, the seed pillow provides conditions that is similar to the way plants grow in natural systems. Indeed, in natural systems, seeds typically grow within groups or clusters due to natural process depositing them within the same microsite. As an example, seeds can be collected within litter material, holes and cracks in the soil surface, or other features that trap wind-blown seeds. Seeds can also be grouped together as a result of caching activities by rodents. For instance, seed caching is considered the primary mechanism of seedling establishment by antelope bitterbrush (*Purshia tridentata* (Pursh) DC), with established plants typically growing together with two or more individuals, in the same bush.

There are multiple positive interactions, or facilitations, associated with planting multiple seeds within the same location as opposed to following standard agronomic practices that evenly space seeds. Without being bound by theory it is believed that in arid or semi-arid ecosystems, positive spatial associations often appear to reduce the effects of drought or high temperatures. For example, seedling survival may be enhanced through: 1) increased soil moisture, by having multiple seedlings growing within the same location improving water retention and infiltration within the microsite of the seedlings, 2) moderation of plant temperature, with increased biomass providing greater insulation from extreme temperatures, and 3) enhanced mineralization, provided indirectly through greater microbial activity as a result of higher concentrations of root mass within an area. In addition to planting multiple seeds of the same species, seed pillow technology may also be used to include nurse plants within the pellet that can minimize harsh environmental conditions, improve substrate characteristics, or increase the availability of resources.

In addition to providing an effective means for clustering seeds of the same species, in an exemplary embodiment, seed pillow technology also allows the mixing of different species within the same pellet. In an exemplary embodiment, for difficult to establish species, a nurse-plant is incorporated into the pellet to facilitate plant growth. For example, various cover-crop species (e.g., alfalfa, oilseed radish, winter pea, pacific gold mustard, oats, and cereal rye) function as a nurse plants for improving establishment of sagebrush (*artemisia* spp.). When planted in the fall, the cover-crops will rapidly germinate and grow prior to winter. These plants then improve site conditions by trapping precipitation (such as windblown snow), scavenging for soil nutrients, increasing organic matter, suppressing weeds, and stimulating microbial activity. Come spring, when the nurse plant has winter killed, sagebrush typically has a site that has more favorable growing conditions. In another exemplary embodiment, seed pillow technology allows for the mixing and matching of various native species. As an example, Indian paintbrush (*Castilleja linariifolia* Benth.) is a hemiparasite, with its fitness improved by extracting nutrients from the roots of a host plant, such as lupine (*Lupinus argenteus* Pursh.).

Seeding Weed Infested Areas

In some exemplary embodiments, seed pillow technology is used to remove or reduce undesirable competitive species (e.g., weeds) thereby allowing seedling establishment of planted species whose seed comprises a seed pillow.

In general, the most effective control of exotic annual grasses has been achieved with pre-emergent (soil active) herbicides. Unfortunately, however, prior to the instant disclosure, seeding of desirable species had to be postponed for at least one year after pre-emergent herbicide application to prevent seeding failure from non-target herbicide damage. Unfortunately, when seeding is delayed for a year or more, exotic annual grasses previously present on the site, and possibly other exotic annuals not previously present, will have started to re-invade the treated site. The reinvasion of annual grasses further reduces an already low success rate for establishing native perennial species. In addition, having to conduct restoration efforts at multiple times dramatically increases restoration costs.

Figure 3:
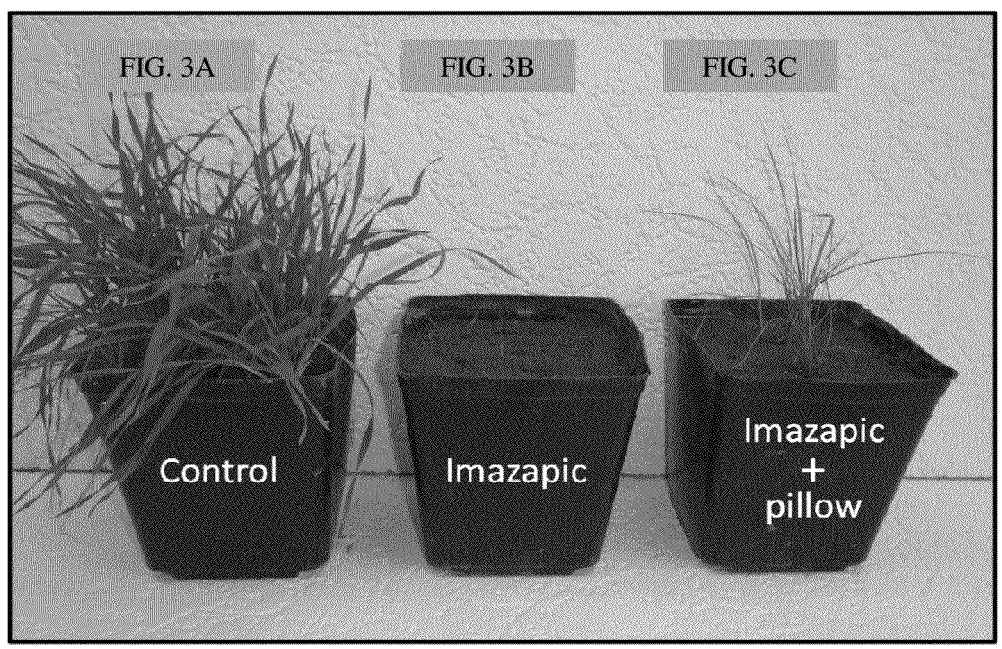
FIG. 3. Photo showing three pots that had been planted with cheatgrass (*Bromus tectorum* L.) and bluebunch (*Pseudoroegneria spicata* (Pursh) A. Löve) wheatgrass seed.
Figure 6:
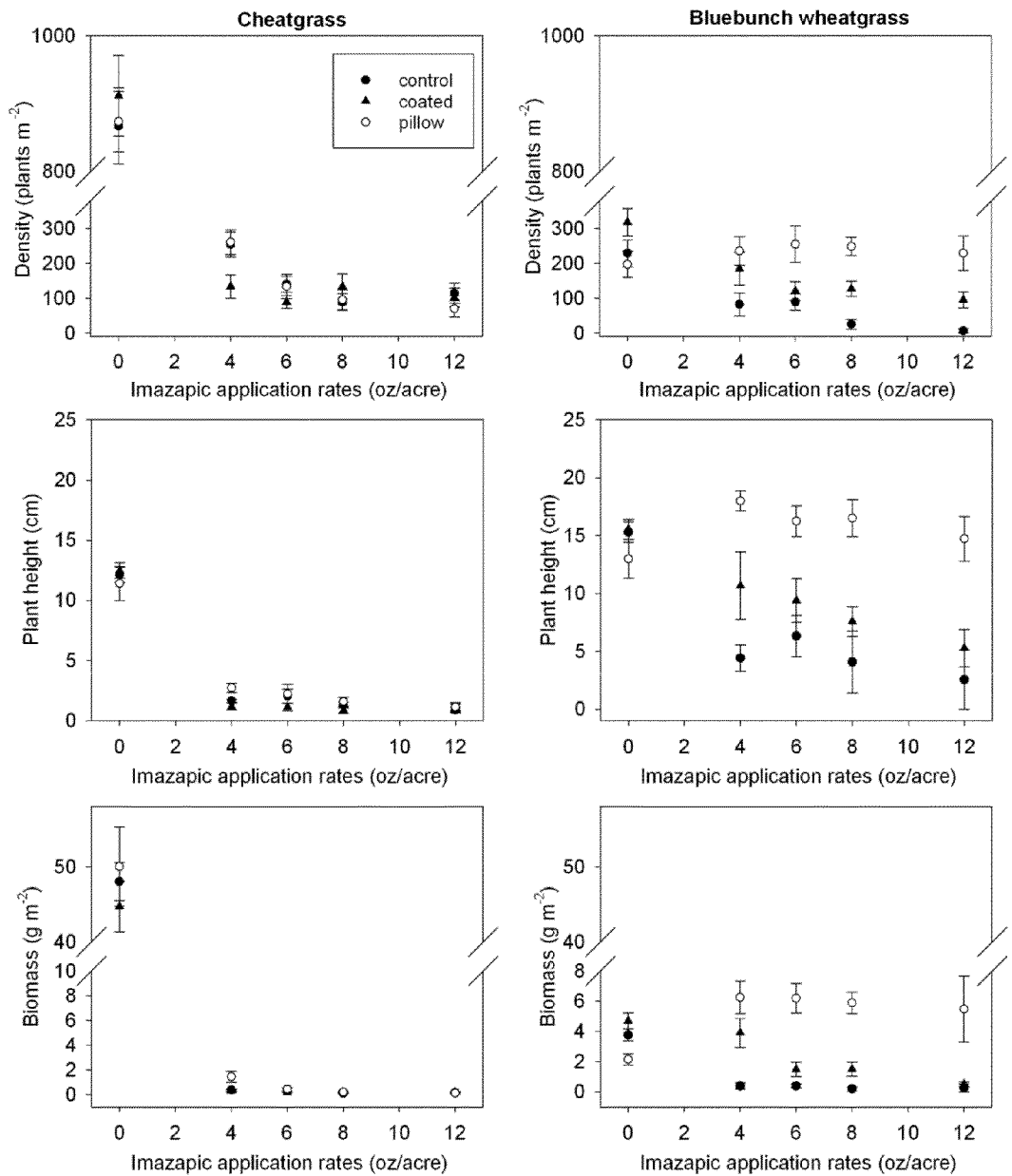
FIG. 6. Average plant density, plant height, and aboveground biomass of non-treated seeds, seed coated with activated carbon, and seed in an extruded pellet of activated carbon (herbicide protection pod), grown in pots treated with either 0, 4, 6, 8, or 12 oz/acre of the soil active herbicide imazapic.

Thus, in general, to ensure that desirable seeds are able to germinate and take hold after undesired species have been removed with soil active herbicides, seed pillow technology allows desired species to successfully be seeded at the same time soil active herbicides are applied. Thus, the desired species is able occupy niches opened by weed control procedures. If desired species are not seeded at the same time pre-emergent herbicide treatment is applied, weeds will rapidly reinvade (FIG. 3).

In one exemplary embodiment, seed pillow technology is used to seed desirable plants at the same time herbicide is applied. Thus, in an exemplary embodiment, the seed pillow comprises activated carbon. In an exemplary embodiment, activated carbon deactivates the herbicides around the seeded species. Activated carbon has a very high surface area allowing it to absorb and bind to herbicides, making them inactive. biochar, an exemplary charred biomass created from organic materials, can be made with many of the same absorbent properties as activated carbon and can also be effective at neutralizing soil active herbicides. In addition to neutralizing herbicide, biochar can improve soil fertility and sequester carbon in the soil. Thus in an exemplary embodiment, biochar is used in seed pillow technology to selectively protect emergent seedlings from soil active herbicides and improve soil fertility thus facilitating survival of seedling of desired species.

Selectivity of the herbicide for weeds can be improved by coating crop seeds with activated carbon in a roto-stat seed coater (see e.g., US Pat. App. Pub. No. 2010/0093535). Incorporating activated carbon into seed pillows, however allows more than 100 times activated carbon to be seeded with the seed of desired species thereby providing improved protection for emergent seedlings. Furthermore, in addition to the protection offer from activated charcoal, the seed pillow provides the seedling with a larger zone of protection from the herbicide, which further minimizes herbicide uptake during the early seedling stages. Thus, in an exemplary embodiment, seed pillows comprising activated carbon or other herbicide neutralizing material, provide a tool for restoring native species in areas invaded by exotic annual grasses and other weeds (FIG. 3). Thus, seed pillow technology allows land managers to effectively apply both herbicide and seed during the same time period. This single entry restoration approach improves revegetation success because competition from exotic annual grasses and other invasive species is reduced for a longer period of time (FIG. 4). Thus, seeded desirable species can be established prior to experiencing significant competition from exotic plants (e.g., exotic annual grasses) (FIG. 4). Since established perennial plants are more competitive with exotic plants as compared to seedlings, seed pillow technology comprising activated charcoal provides a significant growth advantage to the seedlings of desired plant species in herbicide treated areas. Accordingly, seed pillow technology improves the chances for desirable seedlings to out compete exotic plants in areas treated with soil active herbicides.

In addition to improved restoration success, treating seed with activated carbon, biochar or other herbicide neutralizing material may also significantly reduce restoration costs. For example, Imazapic is a common soil active herbicide used to control annual grasses in rangelands throughout the United States. Traditional restoration efforts with imazapic are costly because treatment requires two entry points, (one in the fall to apply the soil active herbicide, and the second to plant desired species one year after herbicide treatment). Seed pillows allow for a single-entry revegetation of exotic annual grass where soil active herbicide is required.

B. Seed Pillow Types

1. Broadcast Seeding Pillows

We have discovered three main structural designs for producing seed pillows for broadcast seeding, which includes 1) pillows containing two extruded layers (seed-core and cover-layer, as described hereinbelow), 2) pillows where the seed layer remains as a dry material that is pressed into the cover-layer dough, and 3) pillows where material is extruded within a single layer.

A exemplary process for manufacturing seed pillows with two extruded layers is shown in FIG. 7 and disclosed hereinbelow. The process comprises a series of operational steps including a separate mixing of seed-core and cover layer materials, extrusion, cutting and drying stage. In an exemplary embodiment, material for the seed-core layer includes field soil or sand, seed, tackifier, binder, absorbent filler materials, biostimulates, and plant protectants mixed into a dough.

The primary material in the seed-core layer is field soil or fine-sand, which is used to increase the weight of the seed-core layer so that the pillow has a higher probably of landing so the seed is next to the soil. To help insure the pillow stays upright, a tackifier is added to glue the pillow to the soil. In an exemplary embodiment, psyllium husk powder is useful as a tackifier and its high water absorbency helps retaining moisture around the seed. Various water sensitive binders can be diluted with water to form the dough mixture and provide stability to the pillow after drying. STARCH 1500® (Colorcon, West Point, Pa.) and SELVOL-205® (Sekisui Specialty Chemicals, LLC, Houston, Tex.), are exemplary of commercially available binders suitable for use in manufacturing seed pillows and seed pellets. To enhance the speed of germination, in an exemplary embodiment, the binder solution contains a plant growth regulator that includes hormones such as auxins, gibberellic acid, and cytokinins. Other exemplary bio-stimulates may also be included in the binder solution or separately mixed into the dough. Some exemplary bio-stimulates include, but are not limited to fertilizers, vitamins, humic and fulvic acids, inoculates, and surfactants.

In exemplary embodiments where predation is a concern, the binder solution can also contain appropriate plant protectants such as fungicides, insecticides, and deterrents.

Suitable absorbent filler materials include but are not limited to diatomaceous earth, beet pulp, super absorbent polymers, peat moss, coir fiber, wood fiber, and rockwool. For more rapid germination, in an exemplary embodiment, seeds are primed prior to being incorporated into the pillow and if necessary treated to break seed dormancy (e.g. chemical and mechanical scarification, stratification, hormonal treatments).

Formulation of the top, cover-layer is similar to core layer with the exclusion of seed and field soil or sand. In place of soil and seed, the cover-layer is composed primarily of high absorbent filler materials. Additionally, the majority of the fertilizer applied is incorporated within the cover layer. By adding the fertilizers in the top layer of the pillow, rather than directly with the seed, salt toxicity is diminished. Furthermore, increased salt concentrations from the fertilizer and the relatively high percentage of absorbent materials in the cover layer sets up a water potential gradient where water can be wicked from the soil up through the pillow.

Dough materials for the top (cover-layer) and bottom (core-layer) layers are extruded separately in sheets using e.g., similar sheet extruder machines as those used for producing cookie or bread dough. Exemplary extruders include e.g., those supplied by Moline Machinery (Duluth, Minn., USA). Using this technology the dough containing seed is extruded onto a conveyer belt, with a thickness of approximately 4-8 mm. To prevent the dough from sticking, in an exemplary embodiment, the belt is dusted with a dry powder, such as ground field soil, fine sand, or diatomaceous earth prior to extruding the seed layer. The cover layer is immediately extruded on top of the seed layer, with a thickness of between about 3 mm to about 8 mm. After extrusion, the materials are molded and cut into individual seed pillows, using e.g., a modified air injection rotary cutter, or other cutting device that is capable of cutting and releasing the dough material. In an exemplary embodiment, an air injection rotary cutter has dies affixed to a drum that molds and scores dough moving down a conveyer. Air is injected into the die to remove the dough after it is cut. Dies with a hexagon shape is preferred, because it eliminates waste and pillow breakage during transport and planting. A cutter with round dies, sometimes have edges cannot lineup with each other. Square or rectangular shapes have large corners that can be broken off during transport and seeding. However, any suitable shape may be used and the skilled artisan having access to the knowledge in the art and this disclosure will be able to choose the best shape for their intended purpose.

Specific to this technology the pillow cutters round the top of the pillow, while leaving the bottom of the pillow flat. After the pillows are cut, they are moved to an industrial forced air drier or other suitable drying system. After drying, the pillows are bagged and prepared for transport to the field.

Another exemplary process for manufacturing seed pillows the seed-core layer is delivered in a dry form (i.e. without binder) onto a reservoir that sits onto of the conveyer belt. A metering gate is used to allow a set height (e.g., approximately twice the thickness of the seed being treated) of material to pass along the conveyer belt. As with the previous embodiment, the cover-layer is extruded on top of the dry material. A press-wheel is then used to force the seed-core material into the upper dough layer. Beyond this stage the material is cut into individual pillows as described in above (option 1). Dry material that does not attach to the cover layer is collected and rerun through the pillow making process.

Option 3: In a third exemplary embodiment, the seed pillow materials described above are mixed together into a single dough mixture. One exception to the recipe used in option 1 is that sand or soil or a combination thereof is not needed to weigh the bottom of the seed pillow. However, in some exemplary embodiments, sand or soil or a combination thereof is incorporated. The dough mixture is then extruded in a sheet with a thickness of between about 3 mm to about 8 mm. After extrusion, the sheet materials is cut as described above, with the exception that it is not necessary to use dies to round the edges of the pillow.

2. Drill Seeding Pillows

Materials and operational steps for producing drill seed pillows involves making a dough mixture containing seed, and the various additives described above for broadcast seed pillows and then running the dough through an extruder that forms and chops the extrusion into cylindrical pellets (FIG. 7). Exemplary extruders capable of forming cylindrical pellets are common within the pasta industry, such as e.g., the TR/95 produced by Rosito Bisani Imports (Los Angeles Calif.). These extruders typically employ a helical feed screw in an elongated tubular barrel, which pushes the pasta in a forward direction through an extrusion die located at the exit barrel. A cutter is mounted at the end of the die that cuts the material into lengths as it is extruded.

The size of the drill seed pillow can vary to meet seed and site conditions. For example large, hard seeded species such as e.g., antelope bitterbrush (*Purshia tridentate* (Pursh) DC.) planted in sandy soil would benefit from having a large amount of absorbent material around the seed to increase moisture to help with seed stratification and germination. A potential pillow size for this species would be approximately 10 mm in diameter by 16 cm long. Smaller seeded species such as sagebrush will not have the ability to emerge through the large pellet and may only need pellets that are approximately 5 mm in diameter by 8 cm long.

The type of materials used in constructing the drilled seed pillow strongly influence the resulting pellet-shaped pillow. Since the pellet needs to remain rigid enough to keep from crumbling during shipping and planting and conversely, after planting it is required that the pellet rapidly dissolve so emerging seedlings are not constrained within the pellet it is useful to employ a binder solution that will confer strength and rigidity to the pellet during transport and seeding, but which will breakdown after planting. Fortunately, we discovered that a partially pre-gelatinized maize starch, trade name STARCH 1500® (Colorcon, West Point, Pa.) provides both rigidity for planting and rapid breakdown after planting. However, other binders or adhesives that confer strength and rigidity to the pellet during transport and seeding, but which will breakdown after planting are suitable for use in preparing a pellet shaped pillow for drill seeding.

Various filler materials can also be used as the base material that is mixed with the binder to form dough that can be ran through the extruder. We prefer to use diatomaceous earth because of its high water absorption capacity, neutral pH, and source of silicon, which has been shown to improve drought resistance. As with seed pillows, the utility of the pellet can be further improved by adding other absorbent materials that have the capacity to swell within the pellet and create voids for oxygen exchange and pathways for emerging seedlings. Example of absorbent materials can include beet pulp, super absorbent polymers, peat moss, coir fiber, wood fiber, and rockwool. Additionally, emergence is enhanced by increasing plant vigor through adding bio-stimulants (e.g. fertilizers, inoculates, wetting agents/soil surfactants, growth regulators), and plant protectants (e.g. fungicides, insecticides).

3. Herbicide Protection Pillows (HPP)

Recipes as disclosed hereinabove, can be used to form seed pillows for broadcast and drill seeding can be modified so they also provide protection from soil active herbicide treatments. In an exemplary embodiment, this is achieved by replacing between about 25%-about 75% of the filler material in the seed pillow with activated carbon or other herbicide neutralizing material, such as e.g., biochar. In one exemplary embodiment herbicide protective seed pillows are prepared by replacing between about 25%-about 75% of the filler material in the seed pillow with activated carbon or other herbicide neutralizing material, such as e.g., biochar.

The following examples are offered to illustrate, but not to limit the invention.

EXAMPLES

Example 1

The following example illustrates the ability of seed pillows as disclosed herein to improve seedling density by comparison to untreated seeds, from a broadcast seeding of a native bunchgrass.

This example compares seedling densities produced from 1) non-treated seeds, 2) seeds incorporated into a two layer extruded seed pillow, and 3) seeds incorporated into a two layer extruded seed pillow with horse manure as fertilizer. Model species used in the evaluation was bluebunch wheatgrass (*Pseudoroegneria spicata* (Pursh) A. Löve). The seed core layer was comprised of a dough mixture containing by weight 5.4% seed, 73.1% fine-sand and 21.5% Selvol® 205 binder, which is a partially hydrolyzed, polyvinyl alcohol (PVOH) binder (Sekisui Specialty Chemicals America, LLC, Houston, Tex.), and was prepared according to Sekisui solution preparation guidelines with 5% solid content (Sekisui Specialty Chemicals, 2009). Cover layer dough without manure contained a mixture by weight of 32.8% diatomaceous earth, 8.5% of the super absorbent polymer Zeba Seed Coating® powder, and 58.6% Selvol® 205 binder also prepared with 5% solids.

Seed pillows were formed by joining a 3.5 mm thick layer of seed core dough with a 5 mm thick layer cover of dough, and chopping into squares that were 10.5 mm on a side. Through this recipe pillows contained approximately 8 pure live seeds each. Immediately after the pillows were cut they were transferred to a forced hot air drier at 23° C. for 30 min.

Methods used to make seed pillows with manure were similar to previous steps with the exception that the cover layer contained a mixture by weight of 3.3% diatomaceous earth, 7.3% Zeba Seed Coating® powder, 23% dry manure powder (approximately 30-400 mesh with the bulk at 100 mesh), and 66.2% Selvol® 205 binder prepared with 5% solids.

Evaluations were performed on sandy-loam soil obtained from the USDA Agricultural Research Services (ARS), Northern Great Basin Experimental Range (NGBER; Lat: 43° 27'34" N, Long: 119° 40'15" W), 67 km west of Burns, Oreg., USA. Soil pH was 7.8, organic matter content was 1.9%.

Sixteen seeds of each treatment (2 pillows) were sown on the soil surface in 14×14 cm pots. Pots were arranged in a completely randomized design with six replications per treatment. Pots were placed in a SG50SS environmental growth chamber (Hoffman Manufacturing Inc., Jefferson, Oreg.) with a 24-hrs cycle of 12-hrs light at 15° C. and 12 hrs dark at 10° C. These temperature cycles were chosen because they represented ±5° C. the average spring (May) conditions for Burns, Oreg. (www.worldclimate.com). Prior to seeding, pots were provided the amount of water required to bring the soil to field capacity. During the course of the study, pots were lightly watered 5 times a week with 6 ml of water day-1 (0.03 ml).

After 32 days, seedling density from seed pillows with and without manure was 3.2 and 3.5-fold higher than non-treated seed (Table 1). These results demonstrate the ability of the seed pillow to dramatically improving seedling density of broadcast seed. The application of manure provided minimal benefit.

TABLE 1

Average plant density (± standard error) produced from 1) non-treated seeds, 2) seeds incorporated into a two layer extruded seed pillow, and 3) seeds incorporated into a two layer extruded seed pillow with horse manure as fertilizer. Unique letters indicate significance using the Tukey-Kramer honestly significant difference test ($P < 0.05$).

| Treatment | plants m$^{-2}$ |
|---|---|
| no-treatment | 93.5 ± 19.0 b |
| pillow | 306.1 ± 19.4 a |
| pillow + manure | 331.6 ± 12.9 a |

Example 2

The following example illustrates the ability of seed pillows to increase seedling density and biomass production by comparison to untreated seed, from a broadcast seeding of a native bunchgrass.

In the greenhouse seedling emergence and plant growth was compared between seeds attached to the bottom of pillows and non-treated seeds (control). Model species included bluebunch wheatgrass and crested wheatgrass (*Agropyron cristatum* (L.) Gaertn).

Prior to attaching seeds to the pillow, they were treated in a RP14DB rotostat seed coater (BraceWorks Automation and Electric, Lloydminster, SK) with the fungicides Thiram® and Allegiance® (Bayer Crop Science, North Carolina) at 0.5% weight of product to weight of seed (w/w) and 0.047% w/w, respectively. To improve seed coverage, the fungicide mixture was diluted with 6.6% w/w water, and 1.3% w/w Sepirent® colorant (Becker Underwood, Ames, Iowa). Seed pillows contained a wet dough mixture by weight of 28% diatomaceous earth, 49% ACA 2045 soil surfactant agent, 17% Zeba Farm® granules, and 6% Zeba Seed Coating® powder, and 7% seed attached to the dough material. The seed pillow was formed into squares that were 10 cm on a side and dried on a forced hot air drier at 23° C. for 30 min.

Soil for this evaluation was collected near Drewsey, Oreg., within the boundaries of the 2010 Lamb Ranch fire, from the subcanopy of burned Wyoming big sagebrush (*Artemisia tridentata* spp. wyomingensis (Beetle & A. Young) S. L. Welsh) (location 43° 38' 47.771" N, 118° 26' 56.515" W, elevation 1,250 m). Soil was derived from residuum and colluvium from tuffaceous sedimentary rock and classified as a gravelly loam, fine, montmorillonitic, mesic Xeric Haplargids. Organic matter averaged 1.5 percent and pH was 7.2. Twenty seeds of each treatment were sown on the soil surface in 14×14 cm pots. Pots were arranged in a completely randomized design with 5 replications per treatment for a total of 20 pots in the study (2 species×2 treatments×5 replications=20).

At the time of seeding, pots were provided the amount of water required to bring the soil to 80% of field capacity. We then watered the pots with 80% of the average monthly amount of precipitation received in the spring (March-May) for our area (average of 26 mm per month; NOAA, 2010). The effect of seed pillows on plant density was explicit, with the pillow treatment producing 3.9 and 5.1 times more seedlings than the control for crested wheatgrass and bluebunch wheatgrass, respectively (FIG. 5A). Biomass production was also higher, with the pillow treatment producing 7.4 and 10.3 times more biomass than the control for crested wheatgrass and bluebunch wheatgrass, respectively (FIG. 5B).

Example 3

The following example illustrates the ability of seed pillows to improve seedling emergence of a drill seeded shrub species.

The objective of this study was to 1) compare seedling emergence from non-treated seed and seed incorporated into pillows designed for drill seeding, and 2) evaluate different additives for incorporating into the pillow for increasing seedling emergence velocity and plant density. To achieve the objectives, nine treatments were implemented. The first two treatments included a non-treated seed (control) and seeds incorporated into a pillow that only contained the basic structural components (blank). We also compared seeds incorporated into a pillow that contained: 1) Seaweed extract (Acadian Seaplants Limited, Dartmouth, Nova Scotia, CAND), 2) Ascend® plant growth regulator (Winfield Solutions, LLC, St Paul, Minn., USA), 3) NutriSeed ZMC® (Agrichem, Loganholme, AUS.), 4) Zeba® super absorbent seed coating powder (Absorbent Technologies, Beaverton, Oreg., USA), 5) Beet pulp (company, city, state), 6) Thiram® and Allegiance® fungicides (Bayer Crop Science, North Carolina, USA), and 7) Peatmoss (company, city, state).

Seaweed extract evaluated in this study was derived from *Ascophyllum nodosum* and has been shown to perform as a plant-growth regulator by eliciting natural cytokinin and auxin production in plants. Ascend is a commercially produced plant growth regulator that contains kinetin, gibberellic acid, and indole butyric acid. NutriSeed is a fertilizer treatment containing 26% Zn, 9.9% Mn, 3.0% Cu, and 1.2% N from urea. Zeba seed coating powder is a molecularly modified super-absorbent-polymer derived from starch. Beet pulp also has a high water holding capacity. We obtained beet pulp stock in the form of compressed pellets. Prior to incorporating into the seed pillow the pellets were soaked in water until saturation, dried, and then ground in a Model 4E Grinding Mill (The Straub Company, Hatboro, Pa.), so the bulk of the material approximated an 18 mesh particle size.

Model species used in the evaluation was Wyoming big sagebrush. Recipes used for producing pillows with different additives listed above is shown in (Table 2). Each recipe was formulated to produce cylindrical pellets 7 mm diameter by 10 mm long, each containing 8 pure-live seeds (PLS) pellet-1.

Seaweed extract evaluated in this study was derived from *Ascophyllum nodosum* and has been shown to perform as a plant-growth regulator by eliciting natural cytokinin and auxin production in plants. Ascend is a commercially produced plant growth regulator that contains kinetin, gibberellic acid, and indole butyric acid. NutriSeed is a fertilizer treatment containing 26% Zn, 9.9% Mn, 3.0% Cu, and 1.2% N from urea. Zeba seed coating powder is a molecularly modified super-absorbent-polymer derived from starch. Beet pulp also has a high water holding capacity. We obtained beet pulp stock in the form of compressed pellets. Prior to incorporating into the seed pillow the pellets were soaked in water until saturation, dried, and then ground in a Model 4E Grinding Mill (The Straub Company, Hatboro, Pa.), so the bulk of the material approximated an 18 mesh particle size.

TABLE 2

Comparison of seedling emergence for non-treated Wyoming big sagebrush (*Artemisia tridentata* Nutt. ssp. *wyomingensis* Beetle & Young) seed (control) and seed that was incorporated into an extruded seed pillow that contained the basic structural components (blank). We also compared seeds incorporated into a pillow that contained: 1) Sea weed extract (Acadian Seaplants Limited, Dartmouth, Nova Scotia, CAND), 2) Ascend® plant growth regulator (Winfield Solutions, LLC, St Paul, MN, USA), 3) NutriSeed ZMC® (Agrichem, Loganholme, AUS.), 4) Zeba® super absorbent seed coating powder (Absorbent Technologies, Beaverton, OR, USA), 5) Beet pulp, 6) Thiram® and Allegiance® fungicides (Bayer Crop Science, North Carolina, USA), and 7) Peatmoss.

| Treatment | Emergence (%) |
| --- | --- |
| control | 7.0 ± 3.0 |
| peat moss | 14.8 ± 5.7 |
| fungicide | 18.7 ± 6.0 |
| beet pulp | 23.3 ± 6.5 |
| seaweed extract | 24.9 ± 5.8 |
| fertilizer | 24.9 ± 4.1 |
| blank | 26.4 ± 5.2 |
| super-absorbent polymer | 31.9 ± 5.3 |
| plant-growth regulator | 35.0 ± 6.7 |

With the exception of peat moss, all pillow treatments significantly improved seedling emergence. The blank pillow treatment had 3.7-fold more seedlings emerge from the control. None of the additives incorporated into the pillow significantly improved emergence over the blank. However, the addition of super-absorbent polymer and plant growth regulator were higher on average than the blank. Pillows with super-absorbent polymer and plant growth regulator produced 4.6 and 5.0 times more seedlings than the control, respectively.

Example 4

The following example illustrates the ability of seed pillows to protect seeds from a soil-active herbicide.

In this study, bluebunch wheatgrass was either left untreated, coated with activated carbon, or incorporated into a seed-pillow containing activated carbon. Source of activated carbon used in the study was Nuchar® powdered activated carbon (MWV, Richmond, Va.). Seeds were coated with activated carbon according to U.S. Patent application 2010/0093535. Seed pillows were formed by mixing dough containing by weight 22% activated carbon, 18.6% diatomaceous earth, 57.9% SELVOL-205 solution with 1% solids, and 1.2% seed. Pellets were extruded and cut into 3 mm thick hexagon pellets that were 13 mm in diameter, with each pillow containing eight pure live seeds.

Bluebunch wheatgrass and cheatgrass were sown in 14×14 cm pots at 500 pure live seeds m-2, and 1000 seeds m-2, respectively. After planting, pots were sprayed with 4, 6, 8, or 12 oz/acre of the pre-emergent herbicide imazapic, or left unsprayed. The study was arranged in a randomized block design with 8 replicates per treatment.

In general, results from this study showed that imazapic effectively controlled cheatgrass growth under all application rates (see e.g., FIG. 3 and FIG. 5). Activated carbon-coated seed appeared to show some resistance to the imazapic treatments, as demonstrated by increased plant density for most imazapic application rates tested (FIG. 5). However, with the exception of plantings at 4 oz/acre, seedling growth in the imazapic treated soil was significantly impaired. In contrast, seeds that were incorporated into seed pillow were protected from imazapic at all application rates (FIG. 5). Improved performance of the herbicide protection pods over activated carbon coated seed is most likely due to the fact that the mass of the material used in the seed pillow is approximately 99 times greater than that for coated seeds. Subsequently, the seedling has a larger zone of protection from the herbicide, which minimizes herbicide uptake during the early stages of seedling development, when seedlings are most susceptible to herbicide uptake.

Thus, herbicide protection pods provide a superior tool for land managers to restore native species in areas invaded by exotic annual grasses and other weeds. Indeed, this technology permits land managers to effectively apply both herbicide and seed during the same time period. This improves revegetation success because competition from exotic annual grasses and other invasive species is reduced for a longer period of time. Thus, seeded species establish prior to experiencing significant competition from exotic plants.

TABLE 3

Average biomass production (± standard error) produced from 1) non-treated seeds (control), 2) seeds incorporated into activated carbon (AC) seed pillow, 3) AC seed pillow plus biostimulants with the plant growth regulator Ascend ® (Winfield Solutions, LLC, St Paul, MN, USA), and fertilizer NutriSeed ZMC ® (Agrichem, Loganholme, AUS.), 4) AC seed pillow plus the super absorbent polymer Zeba ® (Absorbent Technologies, Beaverton, OR, USA), and 5) AC plus biostimulants and super absorbent polymer.

| Treatments | Above-ground biomass (g m$^{-2}$) |
|---|---|
| control | 0.39 ± 0.08 |
| AC pillow | 3.52 ± 1.15 |
| AC + biostimulant pillow | 7.40 ± 2.15 |
| AC + SAP pillow | 3.51 ± 1.15 |
| AC + biostimulant + SAP pillow | 4.65 ± 1.24 |

In addition to improved restoration success, treating seed with activated carbon or biochar may also significantly reduce restoration costs. Traditional restoration efforts with imazapic and other soil active herbicides are costly because treatment requires two entry points, (one in the fall to apply the soil active herbicide, and the second to plant desired species one year after herbicide treatment). Results from our grow-room trials indicate that seed pillows and activated carbon coated seed may allow for single-entry revegetation of exotic annual grass where soil active herbicide is required. Based on this preliminary data, we anticipate that the seed-pillow will provide land managers with desperately needed tools to use with the application of soil active herbicides to control exotic annual grasses and reestablish native plant communities.

Example 5

The following example illustrates the ability of seed pillows to protect seeds from soil-active herbicide and use of beneficial biostimulants and super-absorbent polymer. In the study, treatments included untreated seed and four seed pillow treatments, including seed incorporated into a pillow containing 1) activated carbon, 2) activated carbon plus biostimulants, 3) activated carbon plus super-absorbent polymer, and 4) activated carbon plus biostimulants and super-absorbent polymer. Recipe's used make the seed pillows are shown in Table 4. Pellets were extruded and cut into 3 mm thick hexagon pellets that were 13 mm in diameter, with each pillow containing eight pure live seeds.

Bluebunch wheatgrass and cheatgrass were sown in 14×14 cm pots at 500 pure live seeds m-2, and 1000 seeds m-2, respectively. After planting, half of the pots in the study were sprayed with 8 oz/acre of the pre-emergent herbicide imazapic, or left unsprayed. The study was arranged in a randomized block design with 8 replicates per treatment.

Imazapic effectively controlled cheatgrass growth and non-treated bluebunch wheatgrass seed (Table 4). As with the Example 4, activated carbon seed pillows dramatically improved plant growth with 8.9-fold more biomass than non-treated bluebunch wheatgrass seed (table 4). Incorporating the super-absorbent polymer Zeba® into the seed pillow did not appear to have any additional increase in biomass production. Incorporating the biostimulants Ascend® (plant growth regulator) and NutriSeed ZMC® (fertilizer) into the seed pillow increased biomass production 18.8-fold over the control, and 2.1-fold over activated carbon seed-pillow without biostimulants (Table 4).

TABLE 4

Recipe used for making seed pillows with 1) activated carbon (AC); 2) AC plus the biostimulants that include the plant growth regulator (PGR) Ascend ® (Winfield Solutions, LLC, St Paul, MN, USA), and fertilizer NutriSeed ZMC ® (Agrichem, Loganholme, AUS.); 3) AC plus the super absorbent polymer Zeba ® (Absorbent Technologies, Beaverton, OR, USA) and 4) AC plus biostimulants and super absorbent polymer.

| Ingredients | Carbon | | AC + Biostimulants | | AC + SAP | | AC + Biostimulants + SAP | |
|---|---|---|---|---|---|---|---|---|
| | Batch weight (g) | Percent of total | Batch weight (g) | Percent of total | Batch weight (g) | Percent of total | Batch weight (g) | Percent of total |
| AC | 551.2 | 22.2 | 551.2 | 22.2 | 551.2 | 18.5 | 551.2 | 18.5 |
| DE | 460.9 | 18.6 | 460.9 | 18.6 | 460.9 | 15.4 | 460.9 | 15.4 |
| 1% Selvol-205 | 1435.0 | 57.9 | 1435.0 | 57.9 | 1880.0 | 62.9 | 1880.0 | 62.9 |
| Seed | 30.5 | 1.2 | 31.0 | 1.3 | 37.0 | 1.2 | 37.0 | 1.2 |
| PGR | . | . | 0.1 | 0.004 | . | . | 0.1 | 0.003 |
| fertilizer | . | . | 0.2 | 0.008 | . | . | 0.2 | 0.007 |
| SAP | . | . | . | . | 58.0 | 1.9 | 58.0 | 1.9 |
| Batch Total | 2477.6 | | 2478.4 | | 2987.1 | | 2987.4 | |

Example 6

The following example illustrates the use seed pillows in the form of Herbicide Protective Pods to protect seeds from soil-active herbicide.

Material and Methods for Example 6

Soil and Plant Materials.

Soil was obtained from a Wyoming big sagebrush (*Artemisia tridentata* Nutt. ssp. wyomingensis [Beetle & A. Young] S. L. Welsh)-steppe community type, located at the Northern Great Basin Experimental Range, 16-km southwest of Riley, Oreg. (43° 32'N, 118° 9' W). Soil on the site has a silt-loam texture and is classified as a fine-loamy, mixed, frigid Aridic Haploxeroll (Soil Survey Staff 2012). Soil was excavated from a maximum depth of 25-cm, with the top 2-cm of soil and litter discarded to remove existing seeds. Excavated soil was used to fill square 14-cm wide by 14-cm deep growing pots that were placed in a grow-room at the Eastern Oregon Agriculture Research Center, located in Burns, Oreg., USA.

Species used in the study included the native bunchgrass 'Anatone' bluebunch wheatgrass and the non-native annual weed downy brome. Bluebunch wheatgrass was chosen because it is often a major component of native plant communities in the sage-steppe ecosystem of western North America, is commonly used in rangeland seeding efforts (see e.g., Ogle et al. 2010 Plant guide for bluebunch wheatgrass (*Pseudoroegneria spicata*). USDA-Natural Resources Conservation Service. Idaho and Washington Plant Materials Program. 5 p). Like many grasses used for restoration, bluebunch wheatgrass is injured by imazapic applied at rates required for downy brome control (see e.g., Shinn and Thill 2004 *Weed Technology* 18:60-65). Germination potential of bluebunch wheatgrass and downy brome was 92% and 98%, respectively (as tested on blue blotter paper in 130-mm diameter petri dishes, with 25 seeds·dish−1 replicated four times per species).

Study Design.

Bluebunch wheatgrass seeds were untreated, coated with activated carbon, or incorporated into HPPs containing activated carbon. Pots with the sown seeds were sprayed with 0, 70, 105, 140, or 210 g acid equivalent (ae)·ha−1 (0, 4, 6, 8, or 12 oz·acre−1) of the pre-emergent herbicide imazapic (Panoramic 2SL, Alligare LLC, Opelika, Ala.), (3 seed treatments×5 herbicide application rates=15 experimental treatments). The study was arranged in a randomized complete block design with 8 replicates per treatment.

Activated Carbon Seed Enhancements.

Seeds receiving the seed coating treatment were coated with powdered activated carbon (Nuchar AG®, MWV, Richmond, Va.) at 200% weight of product to weight of seed (wp·w–s) using a RP14DB rotary coater (BraceWorks Automation and Electric, Lloydminster, SK, Canada; Table 1). Using standard seed coating methods, activated carbon was attached to the seeds with the partially hydrolyzed polyvinyl alcohol binder, SELVOL-205® (Sekisui Specialty Chemicals, Dallas Tex., USA; Table 1) at 17% wp·w–s. SELVOL-205 was prepared with an 8% solid content, according to Sekisui Specialty Chemicals solution preparation guidelines (Sekisui Specialty Chemicals, LLC 2009).

The formulation used for producing HPPs contained 4,410% wp·w–s activated carbon, 3,687% wp·w–s diatomaceous earth, and 115% Selvol-205, which was prepared with a 1% solid content (Table 5).

TABLE 5

Batch formulations applied to bluebunch wheatgrass and amount of product applied per seed to produce activated carbon coated seed and herbicide protection pods. A single untreated bluebunch wheatgrass seed weighed approximately 3.05 mg.

| Ingredients | Seed coating batch (g) | Seed coating seed (mg) | Herbicide Protection Pod batch (g) | Herbicide Protection Pod seed (mg) |
|---|---|---|---|---|
| Nuchar | 228.0 | 6.10 | 551.2 | 44.10 |
| diatomaceous earth | | | 460.9 | 36.87 |
| Selvol-205 | 19.8 | 0.53 | 14.4 | 1.15 |
| Water | 208.2 | | 1420.7 | |
| Seed | 114.0 | | 12.5 | |
| Total | 570.0 | 6.60 | 2459.6 | 82.10 |

Following standard procedures used for forming dough and pasta, the dry materials (i.e. activated carbon, diatomaceous earth, and seed) were first thoroughly mixed, after which SELVOL-205 was incorporated with the dry material to form a dough. Dough material was passed through a hand-held extruder (Model #468, Lem Products West Chester, Ohio) that had a rectangular 8-mm×16-mm wide die. Extruded material was cut into 16-mm lengths, producing pods that were 8-mm thick, 16-mm wide, and 16-mm long. Average number of seeds within a pod was equal to 5.4±0.4 (mean±SE, n=15), which is equal to 5.0 pure live seeds (PLS).

Planting, Herbicide Application, and Growing Conditions.

Each pot was seeded with 20 PLS (1000 PLS·m−2) of downy brome, and 10 PLS (500 PLS·m−2) of bluebunch wheatgrass. Two pods were added to each pot designated to receive HPPs. Herbicide was applied immediately after planting, with 2-ml of water·pot−1, using a hand held fine mist sprayer (Model #26028, Mid-states Distributing Co., St. Paul, Minn.). After spraying, pots were incubated in an environmental grow-room set at a constant temperature of 21° C., 12-hr day length, and 632 W·m$^{-2}$ of fluorescent lighting. The study was conducted for 47-days. During the first seven days of the study pots were watered daily to field capacity (−0.01-MPa), and then every two to three days for the remainder of the study. Response variables recorded at the conclusion of the study included: 1) plant density, 2) shoot height, and 3) oven dried (65° C. for 72-hrs) aboveground biomass.

Data Analysis.

Bluebunch wheatgrass and downy brome response data were analyzed separately in SAS (Version 9.3; SAS Institute, Cary, N.C.) using a two-way randomized complete block analysis of variance (ANOVA; Proc Mixed). Effects tested were seed treatment, imazapic application rate and their interactions. Block was considered a random factor. For bluebunch wheatgrass, seed treatment×imazapic application rate interactions were significant; therefore, the LSMEANS procedure was used to compare seed treatment means within imazapic application rate levels (15 comparisons). The resultant P-values were adjusted using a Bonferroni post-hoc test. Significance was determined at P<0.05.

Results for Example 6

Imazapic effectively controlled downy brome and impaired untreated bluebunch wheatgrass at all application rates (Table 6). Averaged across the study, the herbicide reduced downy brome density, height, and biomass by 6.6, 8.0 and 140.2-fold, respectively. Where herbicide was not applied, downy brome biomass dominated the growing space, producing approximately 3-fold more plants and 13-fold more aboveground biomass than bluebunch wheatgrass. Neither of the activated carbon seed enhancement technologies applied to bluebunch wheatgrass reduced imazapic control of downy brome (Table 6).

TABLE 6

Degrees of freedom (df), F, and P (Pr > F) values from ANOVA for the effect of seed technology, and imazapic rate, on plant density, average height and aboveground biomass production. P-values in bold are statistically significant (P < 0.05).

|  |  | Density | | Plant Height | | Biomass | |
|---|---|---|---|---|---|---|---|
| Effect | df | F | P | F | P | F | P |
| | | | | Downy brome | | | |
| Seed Technology (ST) | 2 | 0.4 | 0.668 | 1.0 | 0.385 | 0.8 | 0.465 |
| Imazapic rate (IR) | 4 | 293.5 | <0.001 | 220.8 | <0.001 | 467.9 | <0.001 |
| ST X IR | 8 | 1.5 | 0.158 | 1.0 | 0.477 | 0.5 | 0.875 |
| | | | | Bluebunch wheatgrass | | | |
| Seed Technology (ST) | 2 | 23.0 | <0.001 | 34.2 | <0.001 | 35.7 | <0.001 |
| Imazapic rate (IR) | 4 | 7.0 | <0.001 | 6.5 | <0.001 | 1.9 | 0.110 |
| ST X IR | 8 | 3.4 | 0.002 | 3.8 | 0.001 | 5.8 | <0.001 |

Bluebunch wheatgrass seed coated with activated carbon showed some resistance to imazapic at 70 g ae·ha−1. At this rate, aboveground biomass produced from coated seed was 10.0-fold higher than non-treated seed. While higher on average, biomass from activated carbon-coated seed was not significantly different from non-treated seed when imazapic was applied above 70 g ae·ha−1. Bluebunch wheatgrass density and height were statistically similar for activated carbon-coated and non-treated seeds at all imazapic application rates.

Bluebunch wheatgrass seeds incorporated into HPPs were protected from imazapic at all application rates, including the highest rate recommended by the herbicide manufacturer (210 g ae·ha$^{-1}$; see Panoramic 2SL specimen label). Plant density, height and biomass production from HPPs were slightly higher in the imazapic treated pots than in pots without imazapic application. Averaged across the four levels of herbicide application (excluding the no herbicide level), bluebunch wheatgrass density, height, and biomass produced from HPPs were 1.7, 8.5, and 10.8-fold higher than downy brome, respectively, and 4.8, 3.8, and 19.0-fold higher, respectively, than that produced from the untreated bluebunch wheatgrass seeds.

Seedling density produced from HPPs was not statistically higher than activated carbon-coated seed. However, seedling height produced from HPPs was between 1.7-2.7 fold higher than activated carbon-coated seed under the four levels of herbicide application. Aboveground biomass was between 3.9-11.1 fold higher for HPPs than for activated carbon-coated seed when imazapic application rates were above 70 g ae·ha−1.

Discussion for Example 6

These results indicate that HPPs and, to a lesser extent, activated carbon seed coatings, make it possible for land managers to use a single entry system to plant desired species while simultaneously applying imazapic for weed control. In this Example, imazapic was effective for controlling downy brome; however, significant non-target plant injury occurred to seedlings growing from non-treated bluebunch wheatgrass seed. Under the conditions disclosed herein, biomass production and plant height are more important than plant density as an indicator of protection from imazapic injury.

While activated carbon coated seed improved emergence, growth was suppressed for the majority the seedlings subjected to imazapic application rates above 70 g ae·ha−1. It is expected that stress typical of field conditions will prevented establishment of the stunted seedlings. Activated carbon coatings may be effective in limiting non-target plant injury only at low imazapic application rates (below 70 g ae·ha−1). In contrast, HPP's demonstrated superior plant protection even at high imazapic application rates (up to 210 g ae·ha−1).

It is understood that the examples and embodiments described herein are for illustrative purposes only and that various modifications or changes in light thereof will be suggested to persons skilled in the art and are to be included within the spirit and purview of this application and scope of the appended claims.

What is claimed is:
1. A pillow-shaped multifunctional seed treatment that facilitates seedling establishment, said pillow-shaped multifunctional seed treatment comprising:
   (i) one or more absorbent filler materials;
   (ii) a binder;
   (iii) soil or sand or a combination of soil and sand, and
   (iv) seeds,
wherein,
   said pillow-shaped multifunctional seed treatment has a top cover layer and a bottom layer, wherein the bottom layer is a single layer, and
wherein
   said bottom layer of said pillow shaped multifunctional seed treatment is heavier than said top cover layer, and said bottom layer contains said seeds and said soil,
wherein
   locating the said seeds and said soil or said sand or said combination of soil and sand in said bottom layer of said pillow-shaped multifunctional seed treatment increases a probability that after broadcasting, said pillow-shaped multifunctional seed treatment lands upright with said seeds and said soil or said sand or said combination of soil and sand on the ground instead of said top cover layer on the ground, and
wherein
   said top cover layer is comprised primarily of said one or more absorbent filler materials that cover saids seed upon planting to facilitate seed germination and plant growth.

2. The pillow-shaped multifunctional seed treatment of claim 1, further comprising a tackifier on the surface of said bottom layer.

3. The pillow-shaped multifunctional seed treatment of claim 1, wherein said seeds are members selected from the group consisting of seeds of the same species and seeds of different species.

4. The pillow-shaped multifunctional seed treatment of claim 3, wherein said seeds of different species comprise seeds from at least one nurse-plant.

5. The pillow-shaped multifunctional seed treatment of claim 1, wherein said one or more absorbent filler materials are members selected from the group consisting of diatomaceous earth, beat pulp, peat moss, coir fiber, wood fiber, rockwool, activated charcoal and superabsorbent polymers or a combination of said members.

6. The pillow-shaped multifunctional seed treatment of claim 1, wherein said binder is a member selected from the group consisting of Starch 1500® and Selvol-205 or a combination thereof.

7. The pillow-shaped multifunctional seed treatment of claim 6, wherein said binder comprises a plant growth regulator.

8. The pillow-shaped multifunctional seed treatment of claim 1, wherein said multifunctional seed treatment further comprises at least one member of the group consisting of biostimulants, and plant protectants or a combination thereof.

9. The pillow-shaped multifunctional seed treatment of claim 8, wherein said biostimulates are members of the group consisting of manure, fertilizers, inoculates, wetting agents/soil surfactants, and growth regulators or a combination thereof; and said plant protectants are members of the group consisting of fungicides, insecticides and deterrents or a combination thereof.

10. The pillow-shaped multifunctional seed treatment of claim 9, wherein said fertilizers are located primarily in said top cover layer.

11. The pillow-shaped multifunctional seed treatment of claim 1, wherein said bottom layer of said multifunctional seed treatment further comprises said at least one absorbent filler materials.

12. The pillow-shaped multifunctional seed treatment of claim 11, wherein said at least one absorbent filler materials is a member selected from the group consisting of activated charcoal and biochar or a combination thereof.

13. The pillow-shaped multifunctional seed treatment of claim 12, wherein said multifunctional seed treatment is applied to said ground at the same time herbicide is applied.

14. The pillow-shaped multifunctional seed treatment of claim 1, wherein said pillow shaped multifunctional seed treatment is applied to said ground by broadcast seeding.

15. The pillow-shaped multifunctional seed treatment of claim 1, wherein said bottom layer does not contain said binder.

16. The pillow-shaped multifunctional seed treatment of claim 1, wherein said top cover layer is convex and said bottom layer is flat.

17. The pillow-shaped multifunctional seed treatment of claim 1, wherein said bottom layer is covered with a soil cap.

* * * * *